United States Patent [19]

Gross et al.

[11] Patent Number: 5,439,985
[45] Date of Patent: Aug. 8, 1995

[54] BIODEGRADABLE AND HYDRODEGRADABLE DIBLOCK COPOLYMERS COMPOSED OF POLY(β-HYDROXYALKANOATES) AND POLY(LACTONES) OR POLY(LACTIDE) CHAIN SEGMENTS

[75] Inventors: Richard A. Gross, Chelmsford; Stephen P. McCarthy, Tyngsboro; Michael S. Reeve, Lowell, all of Mass.

[73] Assignee: University of Massachusetts Lowell, Lowell, Mass.

[21] Appl. No.: 98,709

[22] Filed: Jul. 28, 1993

[51] Int. Cl.$^6$ .................. C08G 63/08; C08G 63/84
[52] U.S. Cl. .................................. 525/411; 525/415; 525/450; 528/354; 528/359; 528/360
[58] Field of Search ............... 525/450, 411; 528/354, 528/369, 357

[56] References Cited

U.S. PATENT DOCUMENTS 5,124,371  6/1992  Tokiwa ........................... 525/450

OTHER PUBLICATIONS

Reeve, M. S., McCarthy, S. P., and Gross, R. A., "Preparation and Characterization of PHB-PCL and PHB-PLA," *Macromolecules*, 26(5):888–894 (1993).

Jacobs, C., Dubois, Ph., Jerome, R., and Teyssie Ph., "Macromolecular Engineering of Polylactones and Polylactides. 5. Synthesis and Characterization of Diblock Copolymers Based on Poly-e-caprolactone and Poly (L,L or D,L) lactide by Aluminum Alkoxides," *Macromolecules*, 24(11):3027–3034 (1991).

Dubois, Ph., Jacobs, C., Jéme, R., and Teyssié, Ph., "Macromolecular Engineering of Polylactones and Polylactides. 4. Mechanism and Kinetics of Lactide Homopolymerization by Aluminum Isopropoxide," *Macromolecules*, 24(9):2266–2270 (1991).

Reeve, M. S., McCarthy, S. P., and Gross, R. A., "Polymeric Materials", *Science and Engineering*, 67:182–184 (1992).

Reeve, M. S., McCarthy, Stephen, and Gross, R. A., "The Chemical Degradation of Bacterial Polyesters for Use in the Preparation of New Degradable Block Copolymers", *Polymeric Preprints*, pp. 437–438 (1991, Apr.).

*Primary Examiner*—Patricia A. Short
*Attorney, Agent, or Firm*—Hamilton, Brook, Smith & Reynolds

[57] ABSTRACT

A biodegradable and hydrodegradable diblock copolymer includes a naturally-occurring poly(β-alkanoate) component and a chemically synthesized polyester component formed by ring-opening polymerization. A method of forming the biodegradable and hydrodegradable diblock copolymer having a poly(β-hydroxyalkanoate) component and a chemically synthesized polyester component includes exposing a naturally-occurring poly(β-hydroxyalkanoate) to alcoholysis and then to a trialkyl metal to form a dialkyl metal poly(β-hydroxyalkanoate) macroinitiator. The macroinitiator is then reacted with a lactone or lactide reactant to form the biodegradable and hydrodegradable diblock copolymer.

17 Claims, 9 Drawing Sheets

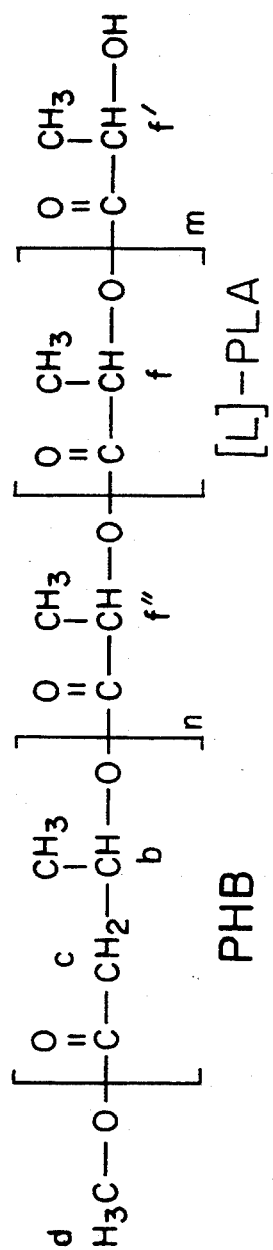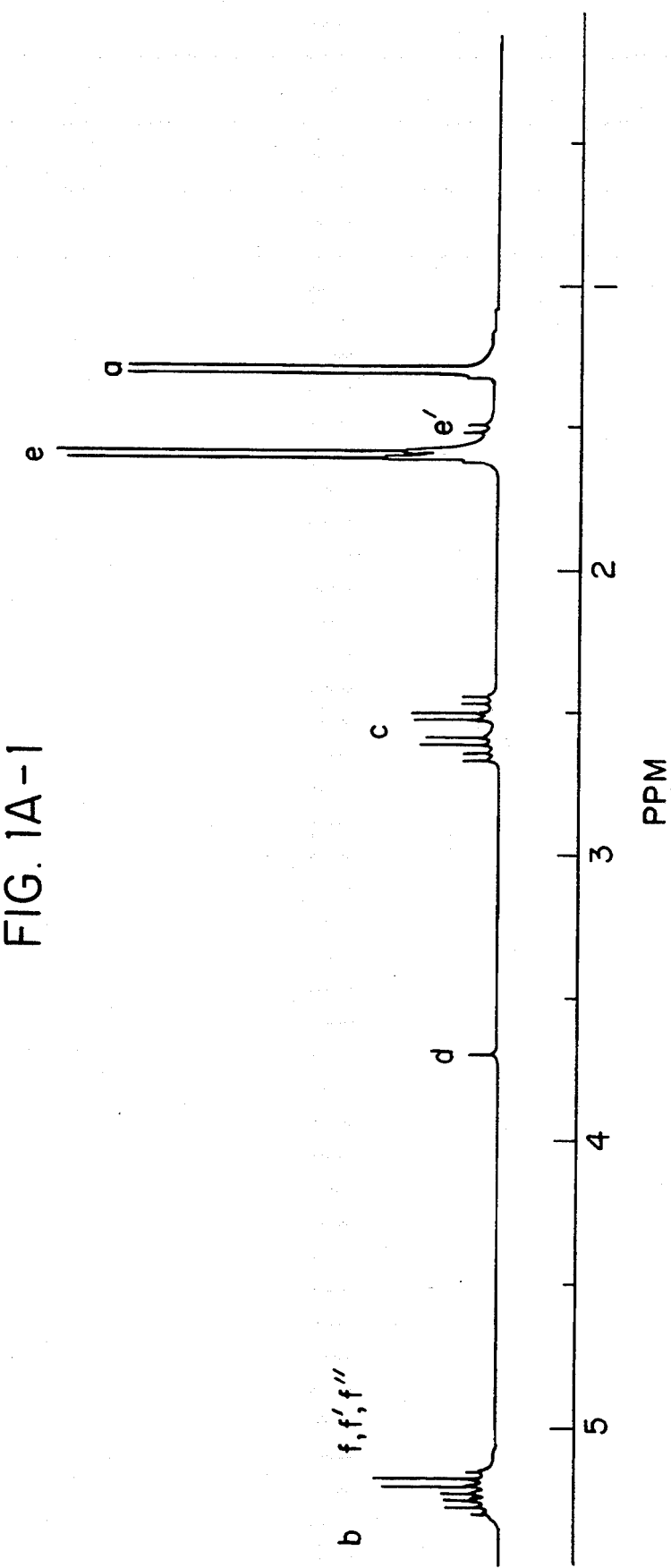
FIG. 1A-1
FIG. 1A

PHB Prepolymer

BIODEGRADABLE AND HYDRODEGRADABLE DIBLOCK COPOLYMERS COMPOSED OF POLY(β-HYDROXYALKANOATES) AND POLY(LACTONES) OR POLY(LACTIDE) CHAIN SEGMENTS

BACKGROUND OF THE INVENTION

Naturally-occurring poly(β-hydroxyalkanoates) are a class of biodegradable polymers which have been the subject of increasing interest as a material which can be employed in disposable articles and specialty medical products. Generally, these polymers exhibit biologically-mediated environmental degradability, hydrolytic degradation and have been shown to possess advantageous characteristics when used in vivo. The most well-known of the poly(β-hydroxyalkanoates) are homopolymers of poly(β-hydroxybutyrate) and copolymers of β-hydroxybutyrate and β-hydroxyvalerate. See, for example, Brandl et al., *Adv. in Biochem. Eng./Biotech.*, 41:77 (1990); Doi, Y., *Microb. Polyesters*, VCH Publishers: New York (1990); Steinbuchel et al., *Mole. Microb.*, 5(3):535 (1991).

Polyesters have been formed by the ring-opening polymerization of lactones and lactides which show biodegradability and biocompatibility. Further, application of specific linear polyesters, such as poly-ε-caprolactone and polylactides, in medical technology has been the subject of particular recent attention. For example, polylactides exhibit relatively rapid bioerodability. In addition, copolymers and diblock copolymers have recently been formed of polylactide and polycaprolactone. See, for example, Jacobs et al., *Macromolecules*, 24(11):3027-3034 (1991) and Dubois et al., *Macromolecules*, 24(9):2266-2270 (1990).

However, the physical properties of poly(β-hydroxyalkanoates) and of linear polyesters formed of lactides and lactones are typically distinct. Consequently, the versatility of articles formed from polymers which include only β-hydroxyalkanoates or biodegradable linear polyesters, such as lactides and lactones, is limited.

Therefore, a need exists for biodegradable and hydrodegradable polymers and methods of forming such polymers which overcome the aforementioned problems.

SUMMARY OF THE INVENTION

The present invention relates to biodegradable and hydrodegradable diblock copolymers of a poly(β-hydroxyalkanoate) and a linear polyester formed by lactone or lactide ring-opening polymerization.

The biodegradable and hydrodegradable diblock copolymer includes a naturally-occurring poly(β-alkanoate) component and a synthetic polyester component. The chemically synthesized polyester component can be formed, for example, from a lactone, such as ε-caprolactone, or a lactide.

The method for forming the biodegradable and hydrodegradable diblock copolymers includes exposing a naturally-occurring poly(β-hydroxyalkanoate) to alcoholysis, whereby at least one low-molecular-weight poly(β-hydroxyalkanoate), having a hydroxyl end-group and an ester end-group, is formed. The hydroxyl end-group of the low-molecular-weight poly(β-hydroxyalkanoate) prepolymer is reacted with a trialkyl metal to form a dialkyl metal poly(β-hydroxyalkanoate) macroinitiator. The macroinitiator is reacted with a lactone or lactide monomer to form a biodegradable and hydrodegradable diblock copolymer having a naturally-occurring poly(β-hydroxyalkanoate) component and a chemically synthesized polyester component.

This invention has many advantages. For example, diblock copolymers can be formed which exhibit a combination of physical properties which are not possessed by homopolymers of any of the components of the diblock copolymer. Further, diblock copolymers can be formed which are tailored to meet narrow requirements of physical properties, such as the rate of biodegradability, hydrodegradability and mechanical strength. The biodegradable and hydrodegradable diblock copolymers of the invention can serve as compatibilizers for blends of biodegradable and hydrodegradable homopolymers. For example, the diblock copolymers can be used to decrease the size of blend component domains, decrease interfacial tension, and improve mechanical properties of immiscible polymer blends.

BRIEF DESCRIPTION OF THE DRAWINGS

FIG. 1A is a $^1$H NMR spectrum of poly(β-hydroxybutyrate)-[L]-polylactide biodegradable diblock copolymer of the present invention.

DETAILED DESCRIPTION OF THE INVENTION

Figure 1B:
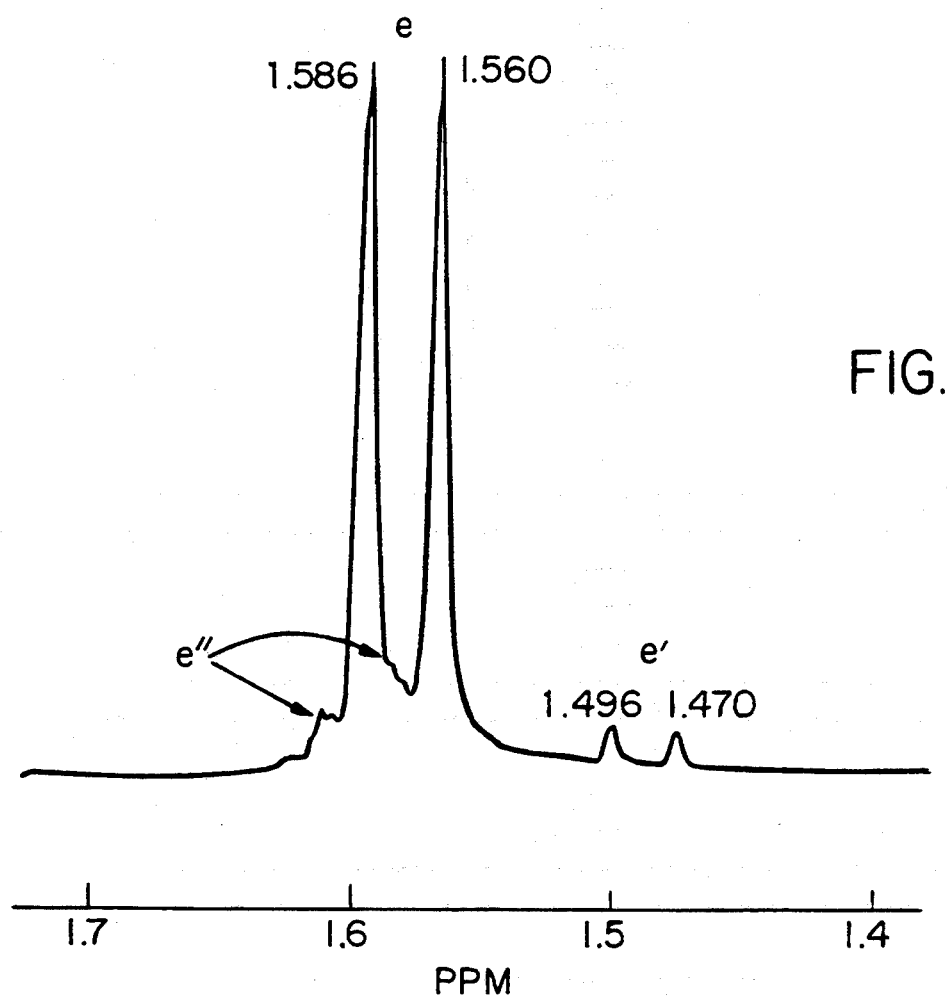
FIGS. 1B-1D display expansions of a polylactide methyl region of the diblock copolymer represented in FIG. 1A, as obtained from $^1$H NMR spectra of the diblock copolymer.

The features and other details of the invention, either as steps of the invention or as combinations of parts of the invention, will now be more particularly described and pointed out in the claims. It will be understood that the particular embodiments of the invention are shown by way of illustration and not as limitations of the invention. The principle features of the invention may be employed in various embodiments without departing from the scope of the invention. Poly(β-hydroxyalkanoates) are a class of β-monoalkyl-substituted poly-β-esters which naturally occur in a wide variety of bacterial microorganisms (hereinafter "PHA"). PHA has the following structural formula:

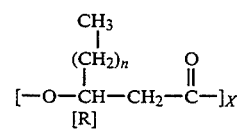

where "n" is in the range of between about 0 and 11, and where "X" is in the range of between about 3,000 and 5,000. "R" refers to an R-type stereochemical configuration.

An example of a suitable PHA is [R]-poly(β-hydroxybutyrate) (hereinafter "PHB"). PHB has the following structural formula:

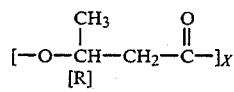

where "X" is in the range of between about 3,000 and 5,000.

Suitable lactones and lactides are those that form biodegradable and hydrodegradable polylactones and polylactides, respectively. A particularly preferred lactone forms a polycaprolactone (hereinafter "PCL") chain segment.

In the method for forming the biodegradable and hydrodegradable diblock copolymers of the present invention, a naturally-occurring PHA of high molecular weight is exposed to alcoholysis to form a low-molecular-weight PHA prepolymer having a hydroxyl end-group and an ester end-group. Preferably, the PHA is PHB. "High molecular weight," as that term is used herein, means a molecular weight in the range of between about 200,000 and 1,000,000 g/mole weight average (Mw). "Low molecular weight," as that term is used herein, means a molecular weight in the range of between about 1,000 and 10,000 g/mole number average (Mn). In a particular preferred embodiment, the alcoholysis is an acid-catalyzed methanolysis and the acid catalyst is sulfuric acid.

The resulting low-molecular-weight PHA prepolymer when the PHA prepolymer is PHB has the following structural formula:

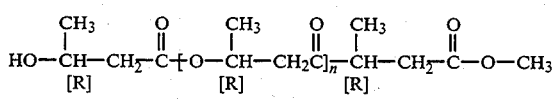

where "n" is in the range of between about 10 and 100.

The low-molecular-weight PHA prepolymer is then exposed to a trialkyl metal reactant under conditions which are sufficient to cause the trialkyl metal to react with the hydroxyl end-group of the low-molecular-weight PHA prepolymer and thereby form a macroinitiator which is a dialkyl metal poly(β-hydroxyalkanoate). The structural formula of the macroinitiator when the PHA and the trialloyl metal are PHB and triethyl aluminum, respectively, is shown below:

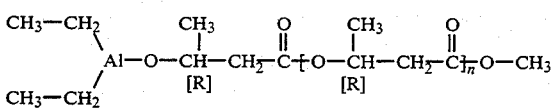

where "n" is in the range of between about 10 and 100. Preferably, the poly(β-hydroxyalkanoate) and the trialkyl metal components of the macroinitiator are PHB and triethyl aluminum, respectively. In a particularly preferred embodiment, the stoichiometric molar ratio between the low molecular weight poly(β-hydroxyalkanoate) and the trialkyl metal reactant is in the range of between about 1 to 1. Also, the reaction is preferably conducted at a temperature of about 25° C. and in a solution of dichloromethane over a period of time in the range of between about 2 and 4 hours.

The macroinitiator is then reacted with a suitable lactone or lactide to form a biodegradable diblock copolymer. Examples of a suitable lactone and a suitable lactide have the following structural formulas:

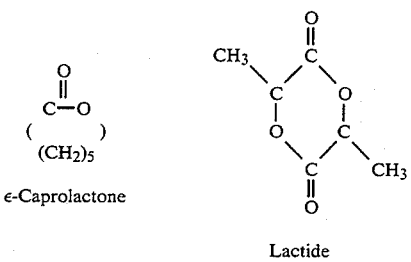

ε-Caprolactone

Lactide

Suitable lactones and lactides are those that form biodegradable and hydrodegradable polylactones and polylactides, (hereinafter "PLA") respectively. A particularly preferred lactone is ε-caprolactone, which forms poly(ε-caprolactone) (hereinafter "PCL"). "Biodegradable" as that term is used herein, means polymers which are degraded by a microbial process under environmental exposures, such as an aerobic composting reactor. "Hydrodegradable" as that term is used herein refers to polymers that undergo hydrolysis when placed in an aqueous environment such as that of body fluids. Examples of biodegradation processes include enzyme mediated hydrolytic and oxidative reactions. "Biodegradable" polymers are biodegraded and thereupon mineralized to $CO_2$, biomass and $H_2O$. "Hydrodegradable" polymers will undergo bond cleavage reactions when exposed to body fluid.

In the embodiment wherein ε-caprolactone is employed as a reactant to form the biodegradable and hydrolytically degradable diblock copolymer, the ε-caprolactone is combined with the macroinitiator, then exposed to a temperature in the range of between about 30° and 50° C. for a period of time in the range of between about eighteen and forty-eight hours. Alternatively, a lactide monomer is combined with the macroinitiator and exposed to a temperature in the range of between about 50° and 70° C. for a period of time in the range of between about three and sixteen days. The lactide can be an [L,L]-, [D,D]-, meso- and [D,L]-lactide, or a combination of these stereoisomers. The molar ratio of the lactone or lactide to the macroinitiator at the start of the reaction is in the range of between about 10 and 100.

The resulting biodegradable and hydrodegradable diblock copolymer includes a naturally-occurring poly(ε-hydroxyalkanoate) component and a synthetic biodegradable and hydrodegradable polyester component. The biodegradable and hydrodegradable synthetic polyester component is formed by the polymerization of the lactone or lactide in the presence of the dialkyl metal poly(β-hydroxyalkanoate) macroinitiator. The biodegradable and hydrodegradable diblock copolymer compositions formed include at least one of the two following general structural formulas:

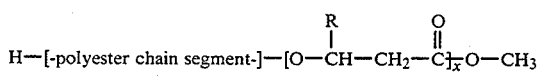

-continued

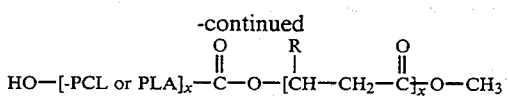

where "x" is, preferably, in the range of between about 10 and 100, and where "R" is an alkyl group, preferably having between about one and nine carbons in the carbon chain. In one specific embodiment, "R" includes at least one vinyl group.

In the embodiment wherein the PHB macroinitiator is reacted with ε-caprolactone a polycaprolactone chain segment is formed. The hydrodegradable and biodegradable diblock copolymer has the following structural formula:

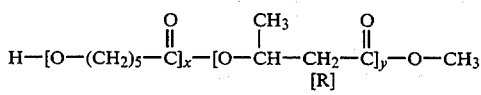

where "x" and "y" are preferably in the range of between about 10 and 100.

Alternatively, in the embodiment wherein the synthetic polyester component of the hydrodegradable and biodegradable diblock copolymer is a polylactide, the resulting biodegradable and hydrodegradable diblock copolymer has the following structural formula:

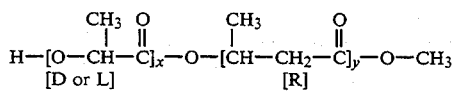

where "x" and "y" are preferably in the range of between about 10 and 100. "D" and "L" refer to stereochemical configuration. Also, although the "R"-type stereochemical configuration, as shown, is preferred, other stereochemical configurations can be employed, such as syndiotatic, stereoblock isotactic, and atactic configurations.

The invention will now be further and specifically described by the following examples. All parts and percentages are by weight unless otherwise stated.

EXEMPLIFICATION

Instrumental Methods

Nuclear Magnetic Resonance (NMR). Proton ($^1$H) NMR spectra were recorded on a Brucker Model WP-270 SY spectrometer at 270 MHz. $^1$H NMR chemical shifts in parts per million (ppm) were reported downfield from 0.00 ppm using tetramethylsilane (TMS) as an internal reference. The parameters for the polymer spectra were as follows: 3.5% wt/wt polymer in CDCl$_3$, temperature 308° K., pulse width 4.9, μs, 32K data points, relaxation delay 0.50 s, 100–200 transients. Peak areas were determined by spectrometer integration.

Infrared Spectra (IR). Spectra were recorded on polymer films cast from chloroform solution onto NaCl plates using a Brucker IFS 113v FT-IR at 25° C.

Molecular Weight Measurements. Molecular weights and dispersities were determined by GPC and VPO. Studies by GPC were carried out using a Waters Model 510 pump, Model 410 refractive index detector, and Model 730 data module with 500 Å, $10^3$, $10^4$ and $10^5$ Å ultrastyragel columns in series. Chloroform was used as the eluent at a flow rate of 1.0 mL/min. Sample concentrations of 0.5% w/v and injection volumes of 100 uL were used. Polystyrene standards with a low polydispersity (Aldrich Chemical Co.) were used to generate a calibration curve. The VPO (UIC. Inc., Model 070) was calibrated with biphenyl in dichloroethane at 33° C., and the polymers were run in dichloroethane at 33° C. to obtain Mn values.

Thermal Analysis. Differential scanning calorimetry (DSC) was conducted on a 2910 differential scanning calorimeter, commercially available from E. I. du Pont de Nemours & Co., and equipped with a TA 2000 data station, using between 7.0–12.0 mg of sample, a heating rate of 10° C./min and a nitrogen purge.

X-ray Diffraction. X-ray diffraction measurements were made by using a Rigaku Geigerflex x-ray diffractometer operating at voltage of 40 kV and a current of 25 mA. The X-ray beam was pinhole collimated. Nickel-filtered CuK$_\alpha$ radiation ($\lambda = 1.542$ Å) was used. The sample exposure times varied from 12 to 17 hours. The sample to film distance used was 4.96 cm.

Synthetic Procedures

PHB Methanolysis. The controlled methanolysis of PHB (natural origin, obtained from ICI Chemical Co.) was carried out to obtain a monohydroxy-terminated PHB methyl ester prepolymer. The high-molecular-weight natural origin PHB was purified by dissolution in chloroform, removal of the chloroform insoluble material by filtration through Celite® 521 (Aldrich Chemical Co.), precipitation of the filtered chloroform solution into methanol and washing of the filtrate with ether. The molecular weight of this starting material was measured as $M_w = 371,000$ and $M_n = 121,000$ by GPC (see above).

Purified PHB (8 g) was dissolved in chloroform (600 mL, distilled twice from anhydrous phosphorous pentoxide under argon) in a 1000 mL 2 neck roundbottom flask. The flask was placed in a waterbath at 35° C. and fit with an overhead stirrer and argon inlet. A 3% sulfuric acid in methanol (v/v) (distilled over sodium under argon) solution was prepared and 200 mL of this solution was added to the PHB solution to initiate polymer methanolysis. Aliquots were removed periodically from the degradation to follow the progress of the reaction. The aliquots were extracted with 5% w/w sodium bicarbonate solution and distilled water until neutrality. The organic layer was dried over anhydrous magnesium sulfate, precipitated into a 10-times-excess of methanol, centrifuged and dried. The molecular weight of the resulting PHB prepolymer was then measured by GPC. When the PHB was degraded to the desired molecular weight, the remaining reaction solution was extracted with sodium bicarbonate and distilled water and the prepolymer was isolated as described above for the withdrawn aliquots. The prepolymer was further purified by dissolution in chloroform, precipitation into cold methanol, separation of the white solid prepolymer by filtration, and drying of the product in vacuo at 35° C. IR spectrum obtained was almost identical to that of the starting natural-origin polymer.

Synthesis of PHB-PCL and PHB-PLA diblocks Considerable precautions were taken during the formation of the diethylaluminum PHB-alkoxide macroinitiator and subsequent ring-opening polymerizations to avoid reactions which would give other oxoaluminum species. The glassware used for macroinitiator formation and polymerizations was silanized with chlorotrimethylsilane, washed with methanol, oven dried, and subsequently flame-dried under vacuum and purged with argon. All chemical transfers were conducted either by gas-tight syringe or cannulation under argon which was passed through columns of anhydrous phosphorous pentoxide coated silica (obtained from Fluka Chemical) (column dimensions 50 by 4.5 cm) and drierite (obtained from VWR Scientific, column dimensions 80 by 5 cm). ε-caprolactone (Aldrich Chemical Co.) was dried for 24 hours over calcium hydride and distilled under reduced pressure. All lactides (Boehringer Ingelheim and Polysciences) were recrystallized from dry toluene and dried under vacuum at room temperature using anhydrous phosphorus pentoxide as a desiccant. N,N-dimethyl-N'-ethylethylenediamine (DMEDA) obtained from Aldrich Chemical Co. was dried and distilled over calcium hydride. Triethyl aluminum (1.9M) in toluene and 2,4-pentanedione (AcAc) were obtained from Aldrich and used as received. Dichloromethane was dried and distilled over anhydrous Phosphorus pentoxide under dry argon (see above).

Triethyl aluminum solution (0.24 mL, $4.55 \times 10^{-4}$ mol), dichloromethane (2 mL) and DMEDA (0.14 mL, $9.1 \times 10^{-4}$ mol) were transferred into a 25 mL internal volume ampoule capped with a rubber septum. In a separate ampoule, 1.0 g of the PHB prepolymer ($M_n = 2,200$, DP=26) was dried for 16 hours using a drying pistol (40° C., 50 μHg). To this ampoule, dichloromethane (15 mL) was transferred and the PHB prepolymer dissolved. The PHB prepolymer solution was then transferred into the ampoule containing the triethyl aluminum/DMEDA/dichloromethane solution and the resulting solution was stirred at room temperature for 3 hours to form the macroinitiator solution.

For the synthesis of PHB-PCL diblocks, ε-CL (1.0 g for DP=12, 2.23 g for DP=38, 3.26 g for DP=51) was transferred into the ampoule containing the macroinitiator solution. The ampoule was cooled, sealed under vacuum and placed into an oil bath at 40° C. for between 18 and 48 hours. (See Table 1).

The synthesis of PHB-PLA diblocks (the procedure followed was identical for [L,L], [D,D], meso and [D,L]-lactide monomer stereochemistries) involved first adding the lactide monomer (1.0 g for DP=13, 2.0 g for DP=23), purified as described above, to an ampoule. The lactide monomer was further dried under vacuum at room temperature in the ampoule using anhydrous phosphorus pentoxide as desiccant for 2 days prior to the polymerization. Dichloromethane (10 mL) was transferred into the ampoule and the lactide was dissolved. The lactide solution was then transferred into the ampoule containing the macroinitiator solution (described above), sealed, and placed into an oil bath either at 50° or 70° C. for time periods ranging from 3 to 16 days (see Table 1).

All PHB-PCL and PHB-PLA diblock copolymers were isolated in the identical manner. The ampoule contents were poured directly into a 10 volume excess of cold methanol, the resultant precipitate was separated by centrifugation and then stirred overnight in AcAc to remove residual organoaluminum molecules (7.5 ml AcAc/g of precipitate). The AcAc product solution/slurry was then poured into a 10 volume excess of cold methanol. The resulting precipitate was separated by centrifugation and dissolved in chloroform. The chloroform product solution was then precipitated into cold methanol.

Spectra of the diblock copolymer products above obtained by $^1$H NMR and IR spectroscopy were consistent with that expected. Additional characterization by GPC, VPO, DSC, X-ray diffraction, NMR structural analysis as well as yields for the products formed are provided below.

The synthesis of low molecular weight PHB was carried out by performing an acid-catalyzed methanolysis on natural-origin PHB. This provided a free secondary hydroxyl functionality as well as a methyl ester-protected carboxylic acid for the two respective chain ends of the polymer chains. The methanolysis reaction was allowed to proceed for 6 hours to produce PHB chains with an Mn value of 2,200 g/mol (D.P.=26, abbreviated as PHB [26]) as determined by VPO and a polydipersity (Mw/Mn) value of 1.76 as determined by GPC. This hydroxyl-functionalized low molecular weight PHB sample was used for the formation of PHB—O—Al(ethyl)$_2$ macroinitiator species. The PHB—O—Al(ethyl)$_2$ macroinitiator species was then used for the preparation of PHB-PCL, PHB-[D,L]-PLA and PHB-[L]-PLA diblocks by catalyzing the ring-opening polymerization of ε-caprolactone, [D,L]-lactide, and [L]-lactide, respectively. Table 1 shows the polymerization conditions, yields, block lengths (determined by VPO), and polydispersities (determined by GPC), for the respective product copolymers:

TABLE 1

| DIBLOCK | Rx time/temp | YIELD[a] | PHB DP[b] | B-BLOCK DP[b] | PDI OF DIBLOCK[c] |
|---|---|---|---|---|---|
| PHB-PCL [26-51][d] | 48 h./40° C. | 73% | 26 | 51 | 1.47 |
| PHB-PCL [26-38] | 24 h./40° C. | 26% | 26 | 38 | 1.40 |
| PHB-PCL [26-12] | 18 h./40° C. | 25% | 26 | 12 | 1.49 |
| PHB-[L]-PLA [26-23] | 16 d./70° C. | 73% | 26 | 23 | 1.32 |
| PHB-[L]-PLA [26-13] | 13 d./50° C. | 27% | 26 | 13 | 1.31 |
| PHB-[D,L]-PLA [26-13] | 3 d./65° C. | 36% | 26 | 13 | 1.31 |

[a] Methanol insoluble product after purification.
[b] Obtained via VPO. Samples were analyzed in dichloroethane with biphenyl as the standards.
[c] Obtained via GPC. Chloroform was used as the eluent and a calibration curve was constructed from polystyrene standards.
[d] The numbers in brackets correspond to the block DP's of the corresponding segments in the diblock copolymer.

GPC chromatographs of the synthesized diblock copolymers showed, in all cases, peaks which were unimodal and higher in molecular weight than the PHB prepolymer. VPO data also showed increases in molecular weight for the diblocks relative to the PHB prepolymer (see Table 1). In addition, the samples were analyzed by $^1$H NMR which confirmed that all of the copolymer diblocks contained both respective repeat unit structures (see FIG. 1A as a representative example).

Figure 1C:
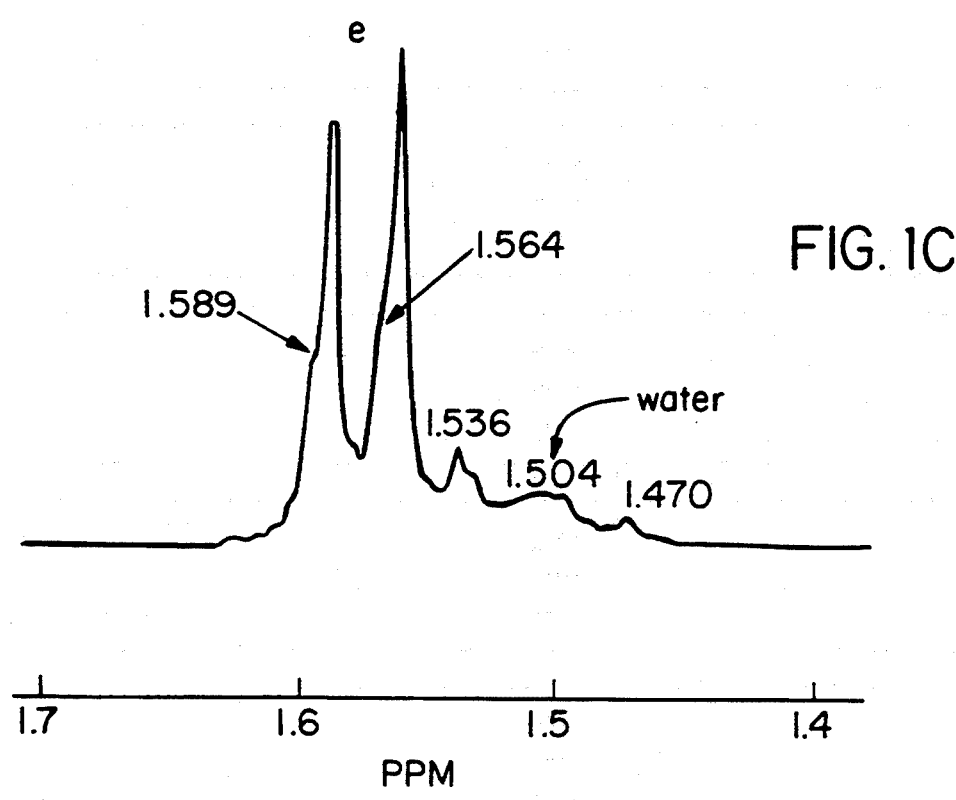
Figure 1D:
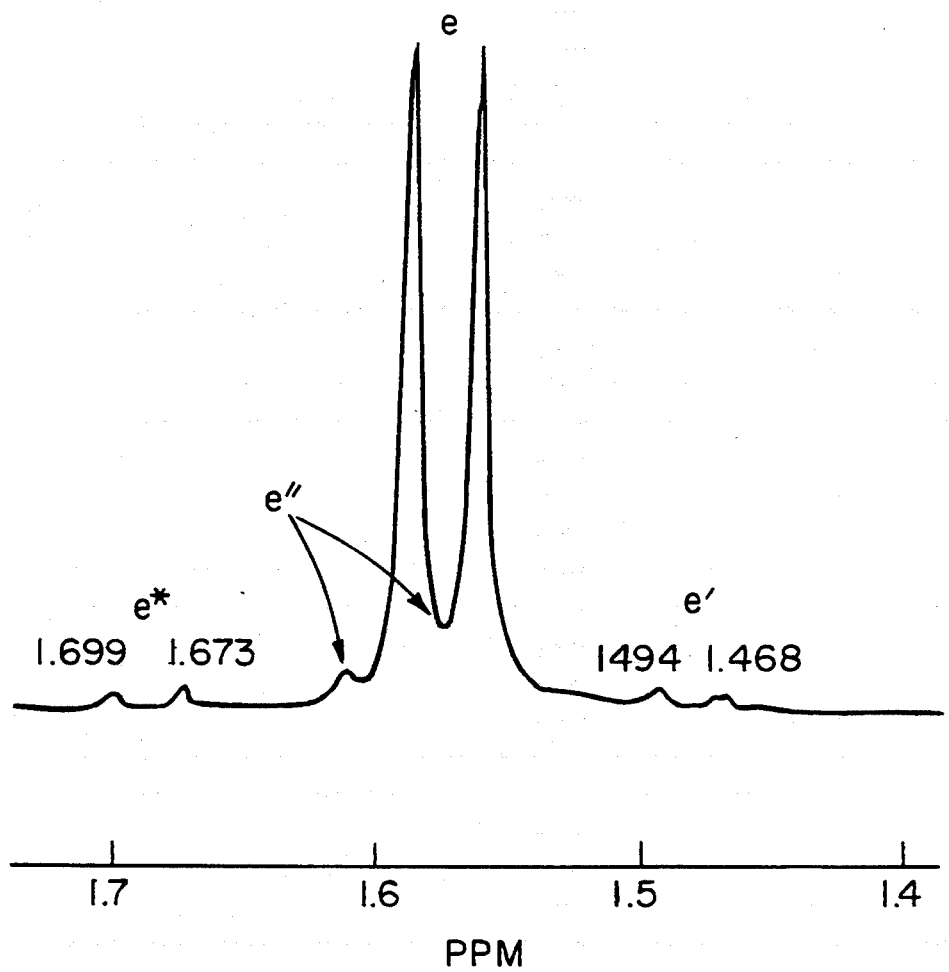
Figures 1, 2A:
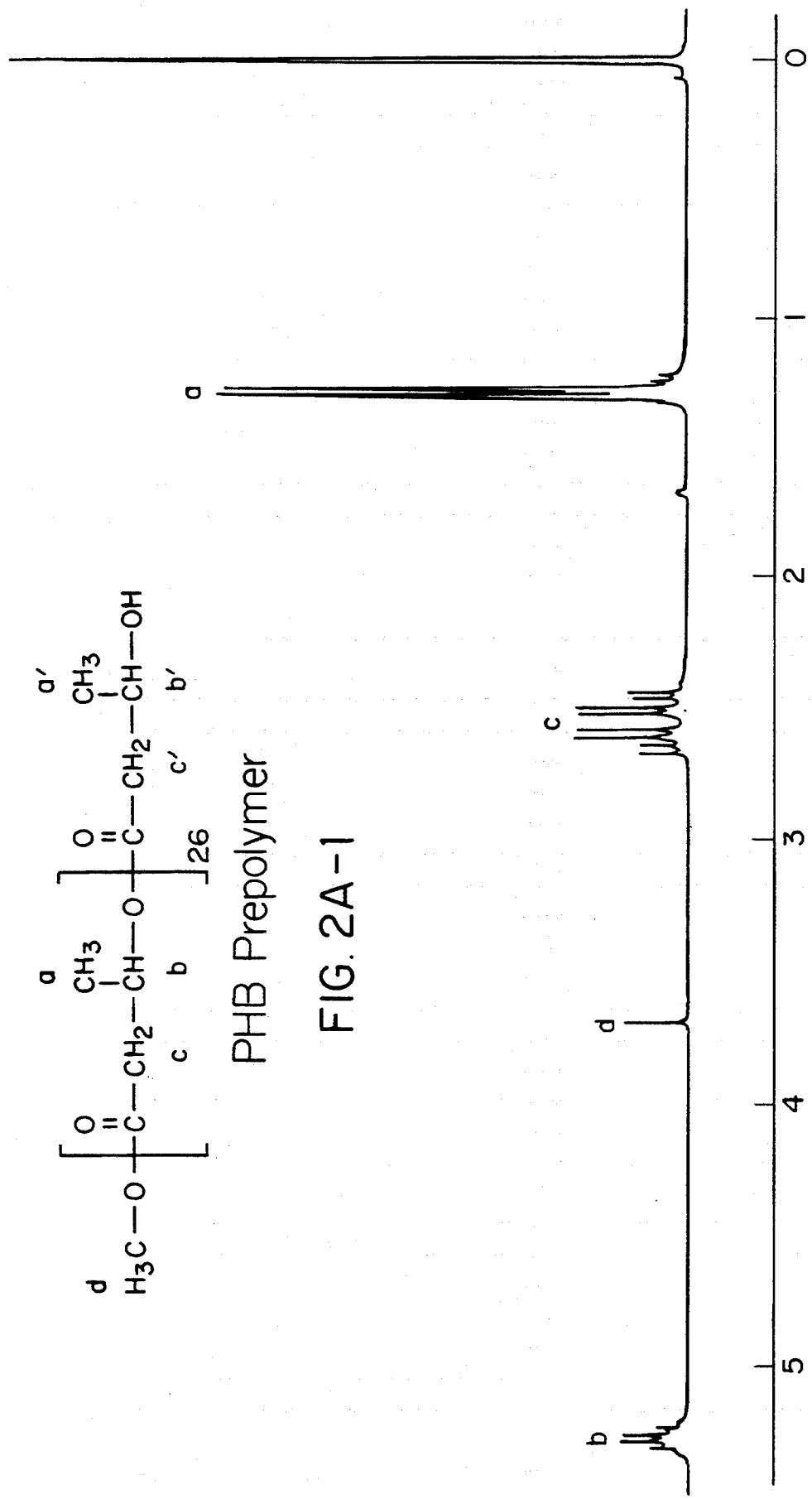
FIG. 2A is the $^1$H NMR spectrum of the PHB prepolymer.

FIG. 1A shows the $^1$H NMR spectrum of PHB-[L]-PLA [26-23] and FIGS. 1B–1D display expansions of the PLA methyl region (hydrogens e, e' and e") from $^1$H NMR spectra of this diblock copolymer recorded under the conditions specified below. FIG. 1A–1 shows the empirical structure of the compound represented by the 'H NMR spectrum of FIG. 1A. In FIG. 1B, the expansion of the methyl region from FIG. 1A is displayed, whereas in FIGS. 1C and 1D, the expanded methyl regions are from spectra of this copolymer mixed with 20% by weight [D,L]-PLA and reacted with trifluoroacetic anhydride, respectively. The upfield shoulders at 1.589 and 1.564 ppm and the peak at 1.53 ppm in FIG. 1C are due to stereochemical sequences present in the [D,L]-PLA component. Three peaks at these chemical shift positions were, of course, observed in the $^1$H NMR spectrum of [D,L]-PLA in the absence of the diblock (spectra not shown). Therefore, comparison of the expansions shown in FIGS. 1B and 1C clearly show that the upfield and downfield doublets at 1.496/1.470 (assigned to hydrogens e', $J_{e'f}=7.0$ Hz) and 1.603/1.576 ppm (assigned to hydrogens e", $J_{e''f}=7.0$ Hz), respectfully, are not due to stereochemical effects, while the doublet at 1.586/1.560 ppm (assigned to hydrogens e) is due to long isostatic stereosequences. It can therefore be concluded that the polymerization of [L]-lactide by the PHB—O—Al(ethyl)$_2$ macroinitiator species did not result in any noticeable loss in enantiomeric purity of the lactide stereocenters.

clearly resolved in FIG. 1B) were due to the e" protons of the lactate repeat units linked to an adjacent PHB segment.

Figure 2C:
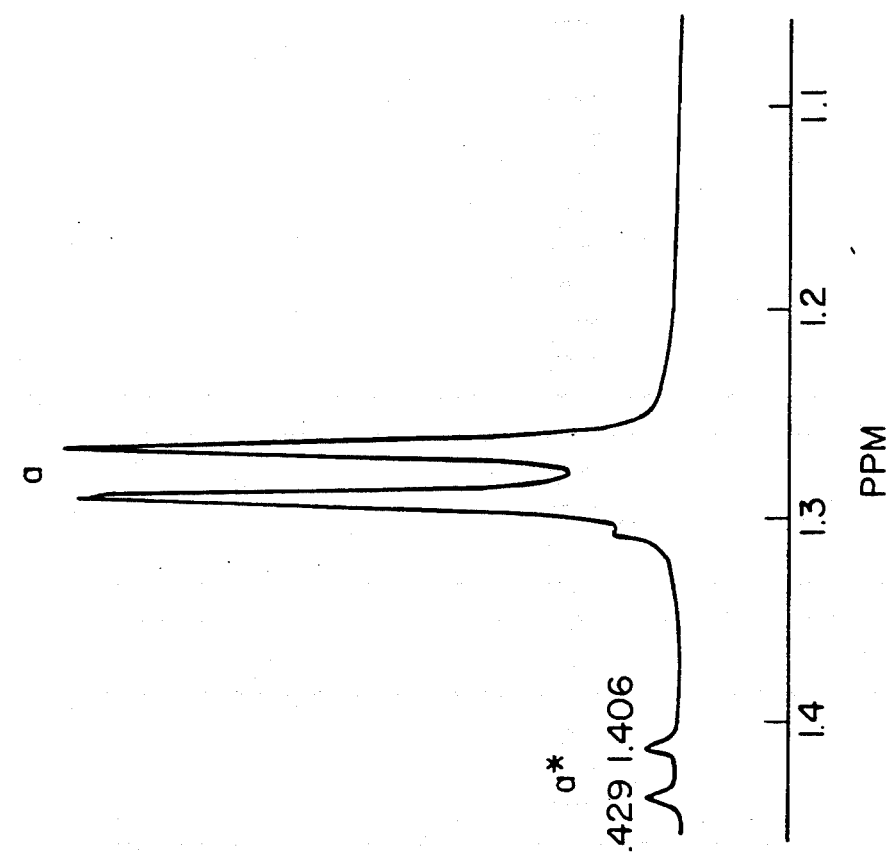
FIGS. 2B and 2C are expansions of the PHB methyl region from the spectrum in 2A before and after reaction with trifluoroacetic anhydride, respectively.
Figure 2B:
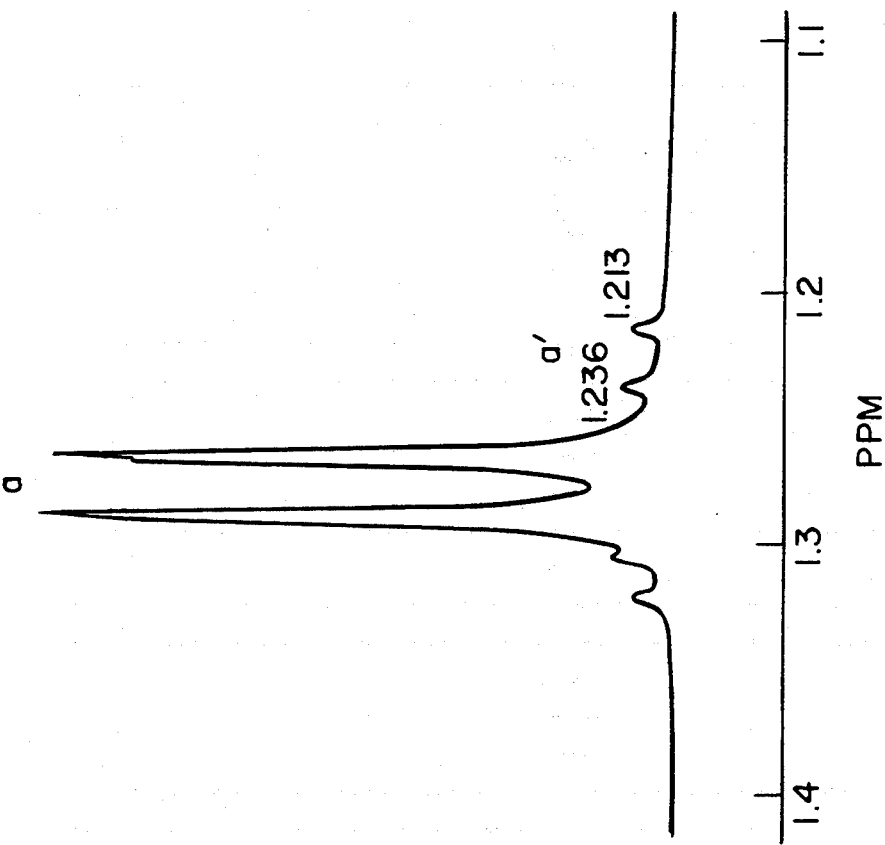

FIG. 2A is an 'H NMR spectrum of the PHB prepolymer. FIG. 2A–1 shows the empirical structure of the compound represented by the 'H NMR spectrum of FIG. 2A. The PHB prepolymer, PHB [26], was similarly reacted with trifluoroacetic anhydride and the $^1$H NMR spectra, before and after the reaction, were compared (see expansions of the methyl regions displayed in FIGS. 2B and 2C, respectively). A decrease in the intensity of the upfield doublet (1,236/1.213 ppm, assigned to hydrogens a', $J_{a'b}=6.2$ Hz) in FIG. 2B and the appearance of a downfield doublet (1.429/1.406 ppm, $J_{a*b}=6.2$ Hz) in FIG. 2C upon reaction of the PHB prepolymer with trifluoroacetic anhydride suggested that the upfield methyl resonance doublet was due to the [R]-PHB prepolymer repeat unit that was at the hydroxyl terminus (labeled as a'). Since the doublet at 1.236/1.213 ppm due to hydrogens a' was not observed for PHB-PCL or PHB-PLA diblock copolymers, and the resonance due to the hydroxyl terminal methyl resonance of the PLA segment was observed (for PHB-PLA diblocks), this then provided additional evidence that the diblock copolymers synthesized herein were indeed formed as described above.

Figure 3:
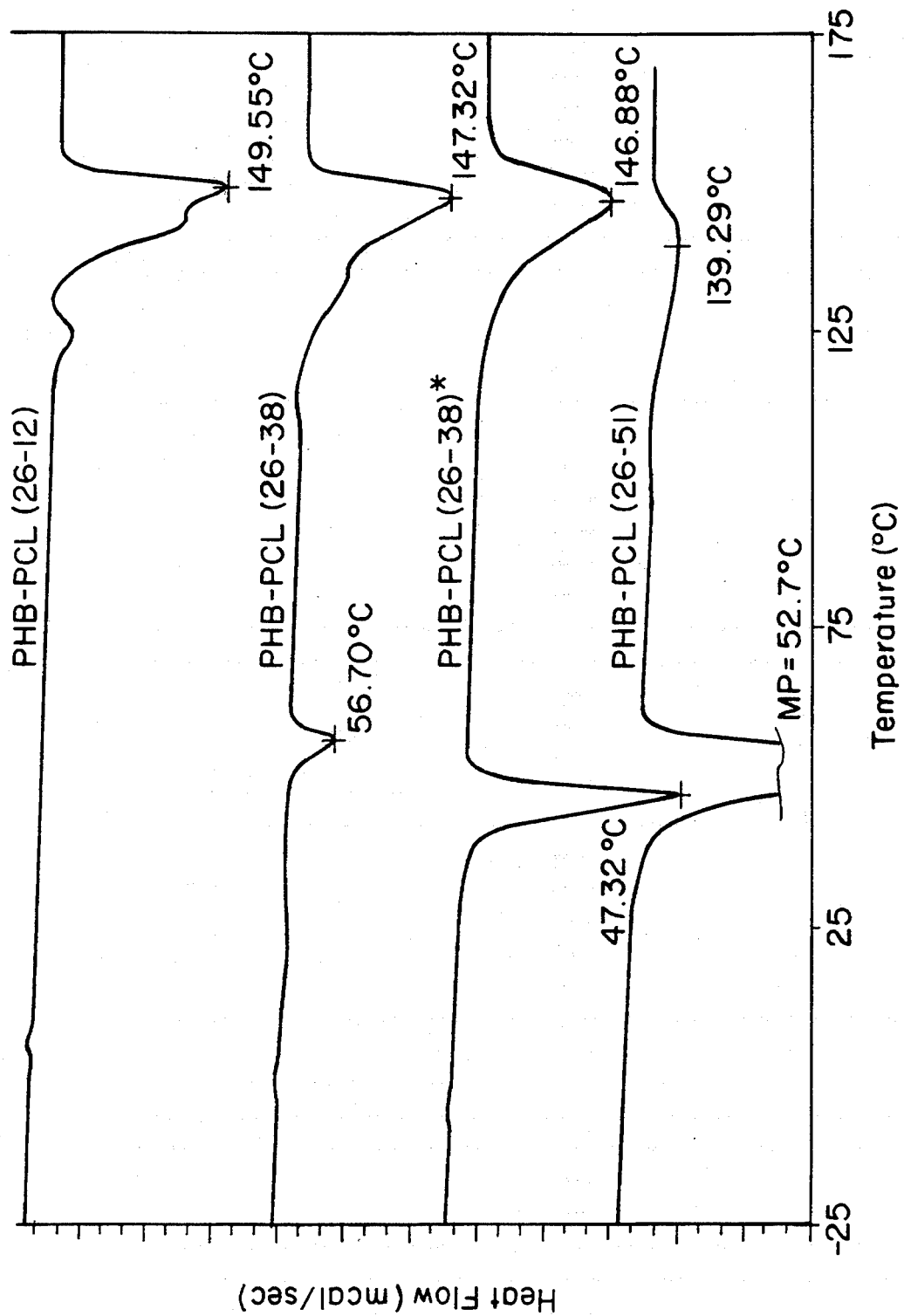
FIG. 3 shows plots of differential scanning calorimetry for diblock copolymers of the present invention which have been formed with different chain lengths of polycaprolactone.

DSC thermograms for the PHB-PCL diblock copolymers synthesized with different PCL chain segment lengths are shown in FIG. 3. In addition, a compilation of the numerical values corresponding to the thermal transitions observed is presented in Table 2, shown below:

TABLE 2

| SAMPLE | SCAN[a] | $T_g$ °C. PHB | $T_g$ °C. PLA | $T_g$ °C. PCL | $T_m$ °C. PHB | $T_m$ °C. PHB/PLA[b] | $T_m$ °C. PCL | PHB | PHB-PLA[b] | PCL |
|---|---|---|---|---|---|---|---|---|---|---|
| PHB [26] | 1 | N.O.[c] | — | — | 148 | — | — | 21.8 | — | — |
| | 2 | −6.4 | — | — | 145 | — | — | 21.5 | — | — |
| PCL | 1 | — | — | N.O. | — | — | 56.0 | — | — | 13.7 |
| | 2 | — | — | −67.0 | — | — | 57.0 | — | — | 14.6 |
| [L]-PLA [23] | 1 | — | 47.1 | — | — | 149.6 | — | — | 14.52 | — |
| | 2 | — | 47.2 | — | — | 149.2 | — | — | 13.59 | — |
| PHB-PCL [26-12] | 1 | N.O. | — | N.O. | 150 | — | N.O. | 17.9 | — | N.O. |
| | 2 | −19.1 | — | N.O. | 151 | — | N.O. | 17.0 | — | N.O. |
| | 3 | N.O. | — | N.O. | 149.5 | — | N.O. | 17.6 | — | N.O. |
| | 4 | −16.1 | — | N.O. | 150 | — | N.O. | 17.3 | — | N.O. |
| PHB-PCL [26-38] | 1 | N.O. | — | N.O. | 148 | — | 56 | 12.8 | — | 1.58 |
| | 2 | N.O. | — | N.O. | 148 | — | 43 | 12.3 | — | N.O. |
| | 3 | N.O. | — | N.O. | 147 | — | 47 | 12.3 | — | 8.1 |
| PHB-PCL [26-51] | 1 | N.O. | — | N.O. | 139 | — | 53 | 3.3 | — | 15.9 |
| | 2 | N.O. | — | N.O. | 142 | — | 51 | 3.3 | — | 11.5 |
| | 3 | N.O. | — | N.O. | 140 | — | 56 | 4.5 | — | 14.2 |
| | 4 | N.O. | — | N.O. | 140 | — | 54 | 3.6 | — | 10.5 |
| PHB-[D,L]-PLA [26-13] | 1 | N.O. | 57.2 | — | 148 | N.O. | — | 17.2 | N.O. | — |
| | 2 | 4.1 | N.O. | — | 149 | — | — | 15.9 | N.O. | — |
| | 3 | 0.45 | 59.9 | — | 149 | — | — | 17.3 | N.O. | — |
| | 4 | 5.7 | N.O. | — | 149 | — | — | 16.4 | N.O. | — |
| PHB-[L]-PLA [26-13] | 1 | 1.66 | 62.7 | — | 148 | N.O. | — | 18.5 | N.O. | — |
| | 2 | 2.90 | N.O. | — | 147 | N.O. | — | 17.4 | N.O. | — |
| PHB-[L]-PLA [26-23] | 1 | N.O. | 54.4 | — | 139 | 139 | — | N.O. | 12.0 | — |
| | 2 | N.O. | 20.0 | — | 135 | 135 | — | N.O. | 8.5 | — |

[a]Numbers indicate the heating scan recorded.
[b]Data pertaining to PLA transitions and/or unresolved PHB and PLA transitions.
[c]N.O. indicates that the transition was not observed.

Figure 4A:
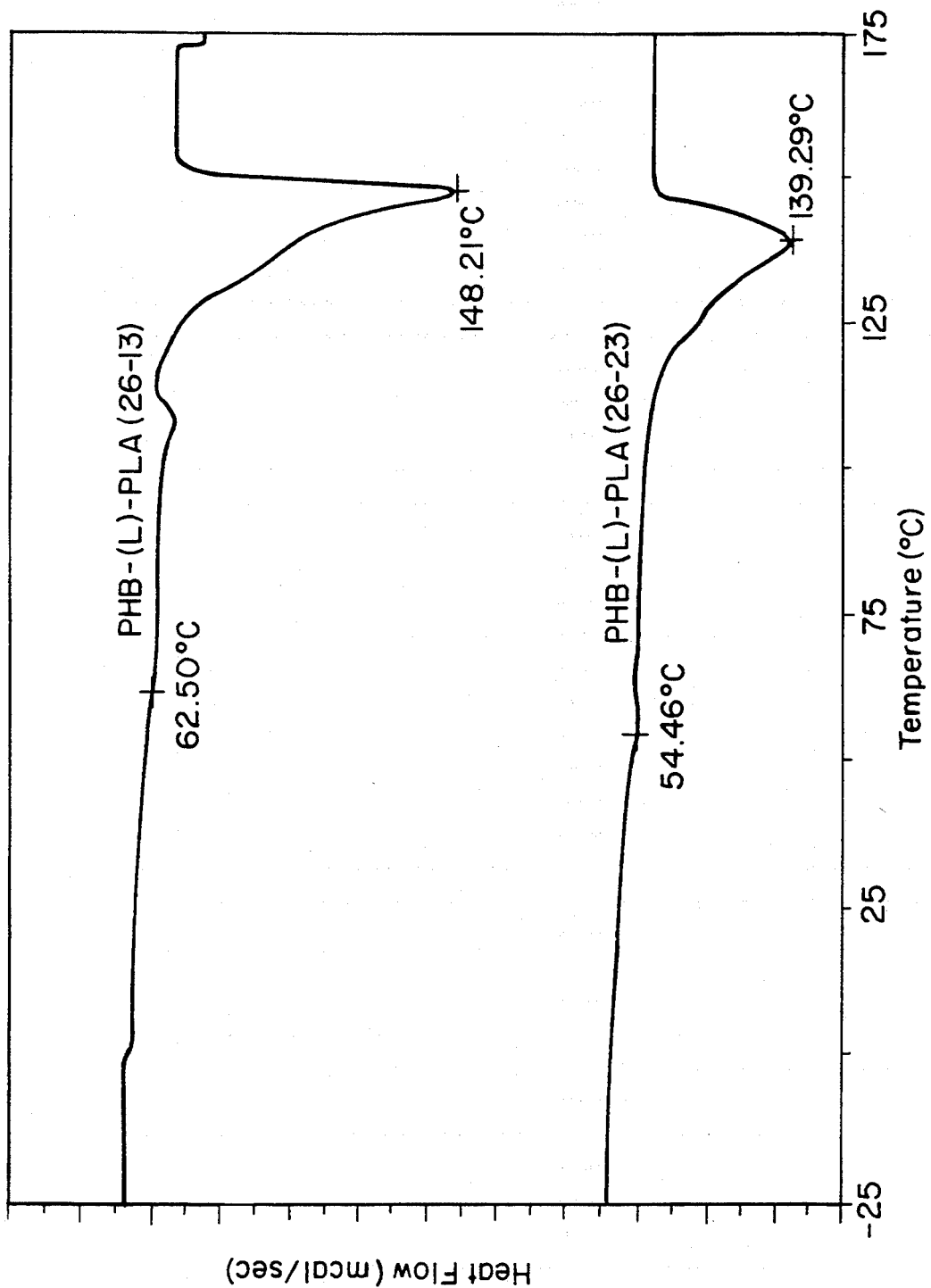
FIGS. 4A and 4B show plots of differential scanning calorimetry analyses of biodegradable diblock copolymers of the invention wherein the biodegradable and hydrodegradable diblock chain segments are PHB and polylactide.
Figure 4B:
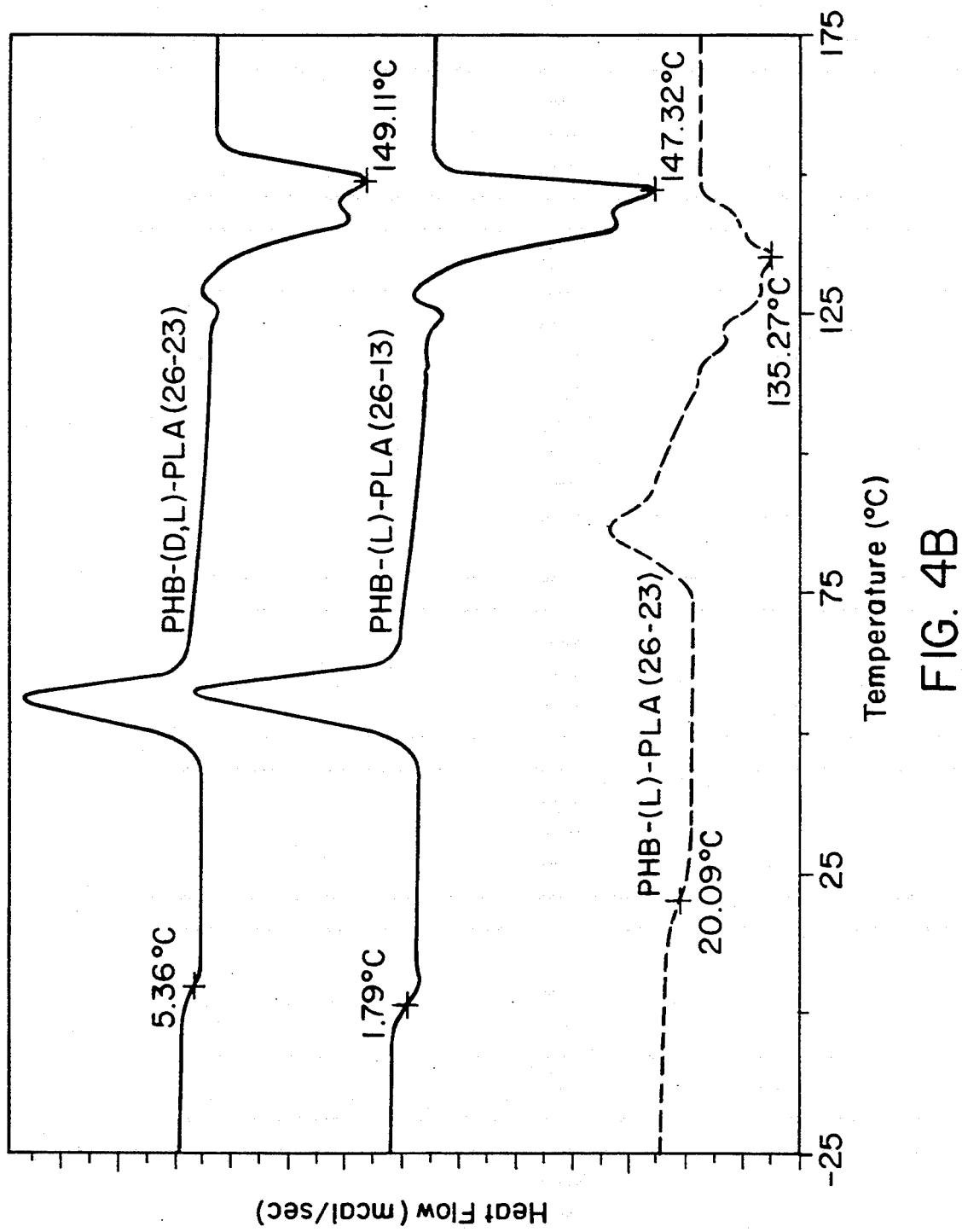
Figure 5:
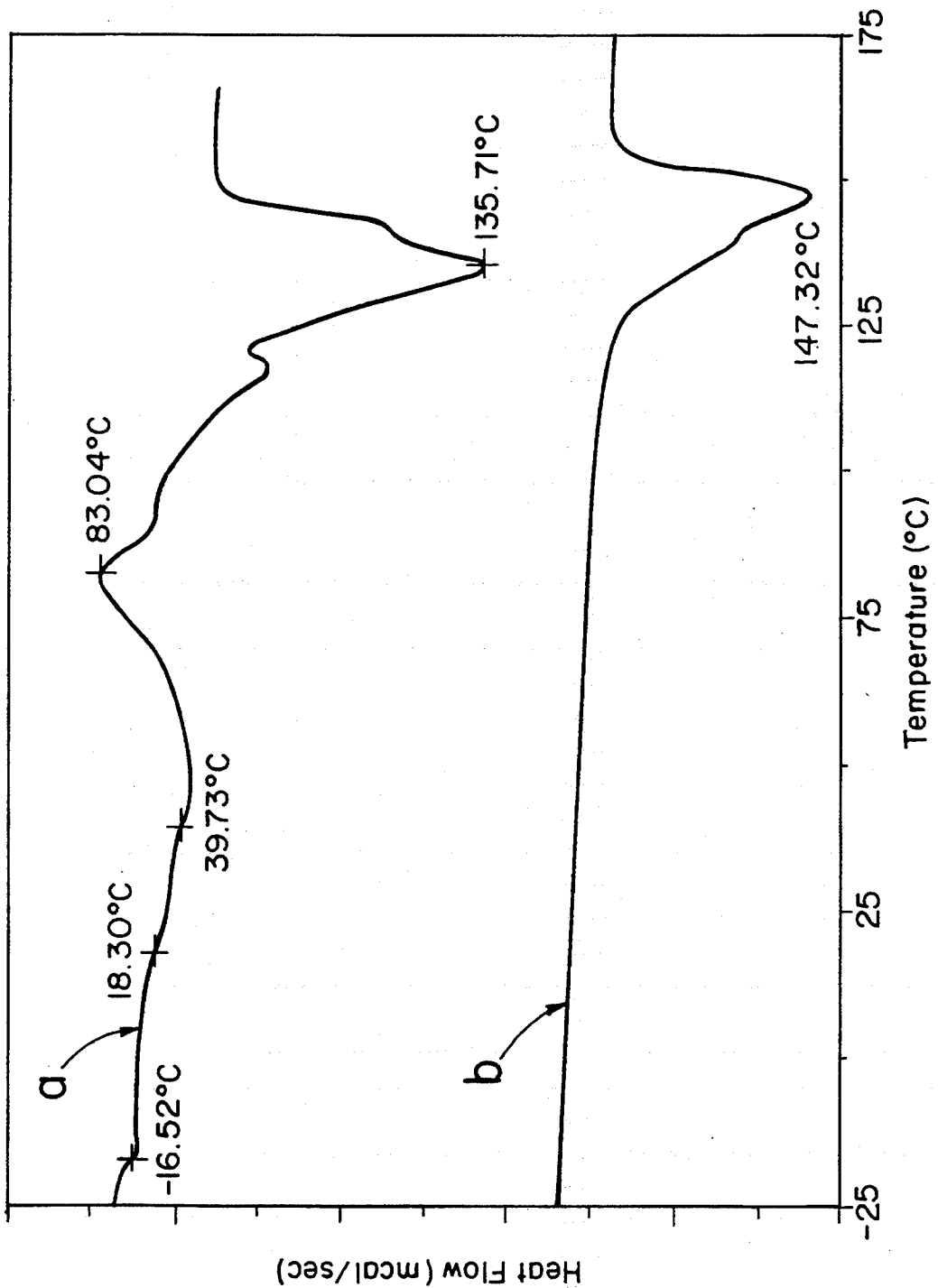
FIG. 5 are of the first and second heating scans, respectively.

The decrease in intensity of the upfield doublet (1.494/1.468 ppm, labeled as e', $J_{e'f}=7.0$ Hz) and the appearance of a new doublet downfield at 1.699/1.673 ppm ($J_{e*f}=7.0$ Hz) upon reaction of the diblock with trifluoroacetic anhydride (see FIG. 1D) suggested that the peaks at 1.494/1.468 ppm are due to the [L]-PLA segment repeat unit which is at the hydroxy terminus. It was also suggested from the above analysis that the methyl doublet resonances at 1.610/1.583 ppm (more The first heating scans on samples, which were prepared by solution precipitation, showed that, for the PHB-PCL [26-12] sample, no melting endotherm corresponding to that of a PCL crystalline phase was observed. However, when the PCL chain segment DP was increased to 38 and 51, peak melting transitions (Tm) at 57° and 53° C. were observed, indicating that PCL crystalline phases were formed. Interestingly, the weak endotherm observed for the solution precipitated PHB-PCL [26-38] diblock sample increased from 1.58 to 8.1 cal/g while the Tm decreased from 57° to 47° C. for a third heating scan, which was recorded after melt annealing the sample at 25° C. for 3 weeks (see FIG. 3, sample designated with an asterisk, and Table 2). This suggested that the melting and subsequent crystallization at room temperature of the PHB-PCL [26-38] sample increased the degree of crystallinity and lowered the degree of order as compared to the initial solvent precipitated sample. In addition, the PHB crystalline phase of the PHB-PCL diblock copolymers showed a slight depression of its Tm (from 147° to 139° C.) as the DP of the PCL chain segment increased from 38 to 51. The Tm value of the PHB prepolymer sample (DP=26) prepared by solution precipitation was 148° C. which agreed well with the Tm values of the PHB crystalline phases formed by the PHB-PCL diblock copolymers with PCL chain segment DP values of 12 and 38. X-ray analysis of the PHB-PCL diblocks and corresponding homopolymers was performed (see Experimental Section) and the d-spacings measured were recorded in Table 3, shown below:

ing endotherm regions (see FIG. 4B). Therefore, it appeared that the PHB-[L]-PLA [26-23] diblock, as opposed to the PHB-[L]-PLA [26-13] sample containing a relatively shorter PLA chain segment length, was forming both PHB and PLA crystalline phases. Once again, X-ray diffraction patterns were recorded for the PHB-PLA diblock copolymers and confirmed that both a PHB and a PLA crystalline phase were formed for the PHB-[L]-PLA [26-23] diblock (see Table 3). This was apparent since the X-ray diffraction of the PHB-[L]-PLA [26-23] diblock was a superposition of the diffraction patterns for both [R]-PHB and [L]-PLA. In contrast, the PHB-[L]PLA [26-13] diblock showed an X-ray diffraction pattern which corresponded to that for only [R]-PHB. Also of interest was the observation that a Tg intermediate to that expected for PHB and PLA (at approximately 20° C.) was observed for PHB-[L]-PLA [26-23] during the second heating scan (see FIG. 4B). For the PHB-[L]-PLA [26-13] first and second heating scans (see FIG. 5, plots "a" and "b" respectively) and the PHB-[L]-PLA [26-23] first heating scan, Tg values were observed which corresponded to the respective component polymers (approximately 0° C.

TABLE 3

| PHB PREPOLYMER[a] | PCL[b] | [L]—PLA[c] | PHB—[L]—PLA [26-23][d] | PHB—[L]—PLA [26-13][e] | PHB—PCL [26-51][f] | PHB—PCL [26-38][g] |
| --- | --- | --- | --- | --- | --- | --- |
| 6.39 (s)[j] | 5.49 (w) | 6.76 (m) | 6.38 (s) | 6.43 (s) | 6.42 (m) | 6.81 (w) |
| 5.08 (s) | 4.50 (w) | 5.71 (m) | 5.78 (w)[h] | 5.61 (w) | 5.54 (w)[i] | 6.29 (s) |
| 4.36 (w)[j] | 4.05 (s) | 5.15 (s) | 5.14 (s) | 5.14 (s) | 5.10 (m) | 5.49 (w) |
| 4.06 (m)[j] | 3.93 (m) | 4.53 (s) | 4.52 (m) | 3.95 (m) | 4.08 (s) | 4.95 (s) |
| 3.40 (m) | 3.65 (s) | 4.02 (w) | 3.88 (m) | 3.44 (m) | 3.96 (w) | 4.25 (m) |
| 3.21 (m) | 2.29 (w) | 3.77 (m) | 3.42 (w) | 3.23 (w) | 3.68 (m) | 4.00 (s) |
| 2.95 (w) | | 3.48 (w) | 3.19 (w) | | 3.43 (w) | 3.62 (w) |
| | | 3.14 (w) | | | 2.95 (w) | 3.35 (w) |
| | | 2.98 (w) | | | | 3.17 (w) |
| | | | | | | 2.78 (w) |
| | | | | | | 2.66 (w) |

[a]DP = 26 by VPO, methanol precipitated powder, 12 h. exposure.
[b]Powdered pellets supplied by Union Carbide Co., TONE Polymer P-300, Mw = 34,200/Mn = 21,000 g/mol by GPC, 12 h. exposure.
[c]Melted and annealed film, Mw = 2.28 × $10^5$ g/mol by GPC, 15 h. exposure.
[d]Methanol precipitated powder, 15 h. exposure.
[e]Methanol precipitated powder, 12 h. exposure.
[f]Methanol precipitated powder, 12 h. exposure.
[g]Melted and annealed film, 17 h. exposure.
[h]single underline denotes d-spaces indicative of an [L]—PLA crystalline phase.
[i]Double underline denotes d-spaces indicative of a PCL crystalline phase.
[j]INTENSITIES: w = weak; m = medium; s = strong.

The existence of d-spacings for the diblock copolymer samples which resulted from a superposition of those expected for the respective homopolymers were used herein as evidence that both components of the diblock formed distinct crystalline phases. From observation of Table 3, it appeared that a PCL crystalline phase was not formed for the PHB-PCL [26-12] diblock but was present for the longer PCL chain segment diblocks. This is in agreement with the DSC measurements presented above.

DSC analyses were also performed on the PHB-PLA diblocks (see Table 2 and FIG. 4). A comparison of the second heating scans for the PHB-[D,L]-PLA [26-23] and the PHB-[L]-PLA [26-13] diblocks (see FIG. 4B) showed essentially identical thermograms which suggested that, for the steroisomerically pure PHB-[L]-PLA [26-13] diblock, the [L]-PLA component did not order into a crystalline phase and therefore did not contribute to either the melting endotherm or crystallization exotherm observed. In contrast, the second heating scan of the PHB-[L]-PLA [26-23] diblock showed complex and broad crystallization exotherm and melting endotherm regions (see FIG. 4B).

for PHB and approximately 55° C. for PLA). It appeared, therefore, that the PHB and PLA phases of the diblock sample, when quickly quenched from the melt, were kinetically frozen into a solid state morphology such that the PHB and PLA remained as one phase. Indeed, this showed the miscibility of the PHB and PLA chain segments in the melt. When this same sample was slowly cooled from the melt and melt annealed at 55° C., phase separation occurred and two Tg values corresponding to the PHB and PLA phases were once again observed.

Equivalents

Those skilled in the art will recognize, or be able to ascertain using no more than routine experimentation, many equivalents to the specific embodiments described specifically herein. Such equivalents are intended to be encompassed in the scope of the following claims.

We claim:

1. A biodegradable and hydrodegradable diblock copolymer comprising:

a) one naturally-occuring poly(β-alkanoate) segment; and b) one biodegradable polyloactone or polylactide segment.

2. The diblock copolymer of claim 1 wherein the naturally-occurring poly(β-alkanoate) segment is poly(β-hydroxybutyrate).

3. The diblock copolymer of claim 2 wherein the naturally-occurring poly(β-alkanoate) has a low molecular weight.

4. The diblock copolymer of claim 3 wherein the biodegradable segment includes polycaprolactone.

5. The diblock copolymer of claim 3 wherein the biodegradable segment includes polylactide.

6. The diblock copolymer of claim 1 wherein the block lengths contain greater than about 10 repeat units.

7. A method for forming a biodegradable and hydrodegradable diblock copolymer of a natural origin poly(β-hydroxyalkanoates) and a biodegradable polyester component, comprising the steps of:

a) exposing a naturally-occurring poly(β-hydroxyalkanoate) to alcoholysis, whereby at least one low-molecular-weight poly(β-hydroxyalkanoate) prepolymer, having a hydroxyl end-group and an ester end-group, is formed;

b) reacting the hydroxyl end-group of the low-molecular-weight poly(β-hydroxyalkanoate) prepolymer with a trialkyl metal to form a dialkyl metal poly(β-hydroxyalkanoate) macroinitiator; and c) reacting the macroinitiator with lactone or lactide reactant to form a biodegradable diblock copolymer having one naturally-occurring poly(β-hydroxyalkanoate) segment and one biodegradable polyester segment.

8. The method of claim 7 wherein the alcoholysis includes methanolysis and whereby the ester end-group is a methylester end-group.

9. The method of claim 8 wherein the trialkyl metal includes triethylaluminum.

10. The method of claim 9 wherein the naturally-occurring poly(β-hydroxyalkanoate) includes poly(β-hydroxybutyrate), whereby the dialkyl metal poly(β-hydroxyalkanoate) macroinitiator includes diethyl aluminum poly(β-hydroxybutyrate).

11. The method of claim 10 wherein the macroinitiator is reacted with ε-caprolactone to form a biodegradable diblock copolymer which includes one naturally-occurring poly(β-hydroxybutyrate) segment and one polycaprolactone segment.

12. The method of claim 10 wherein the macroinitiator is reacted with a lactide monomer to form a biodegradable diblock copolymer which includes one naturally-occurring poly(β-hydroxybutyrate) segment and one polylactide segment.

13. The method of claim 12 wherein the lactide is a (L,L)-lactide monomer.

14. The method of claim 12 wherein the lactide is a (D,L)-lactide monomer.

15. The method of claim 12 wherein in the lactide is a meso-lactide monomer.

16. The method of claim 12 wherein the lactide is a (D,D)-lactide monomer.

17. The method of claim 12 wherein the lactide includes at least on lactide selected from the group consisting essentially of: an (L,L)-lactide monomer; a (D,L)-lactide monomer; a meso-lactide monomer; and a (D,D) lactide monomer.

* * * * *